July 8, 1924.

R. B. FAGEOL

BUMPER MOUNTING

Filed Jan. 31, 1923 2 Sheets-Sheet 1

1,500,380

INVENTOR
ROLLIE B. FAGEOL

BY Dewey, Strong, Townsend and Loftus
ATTYS.

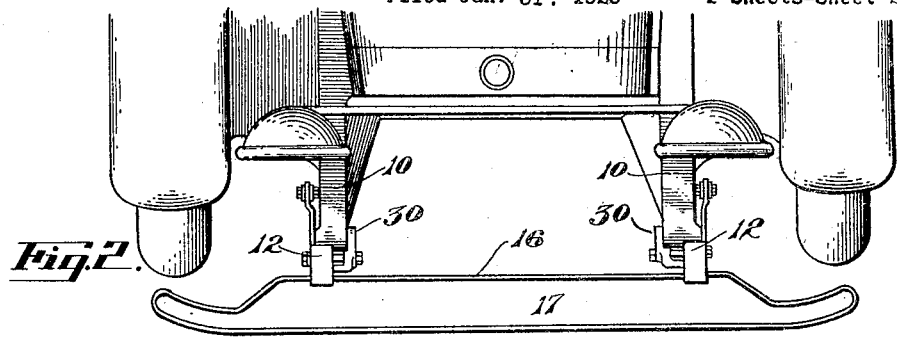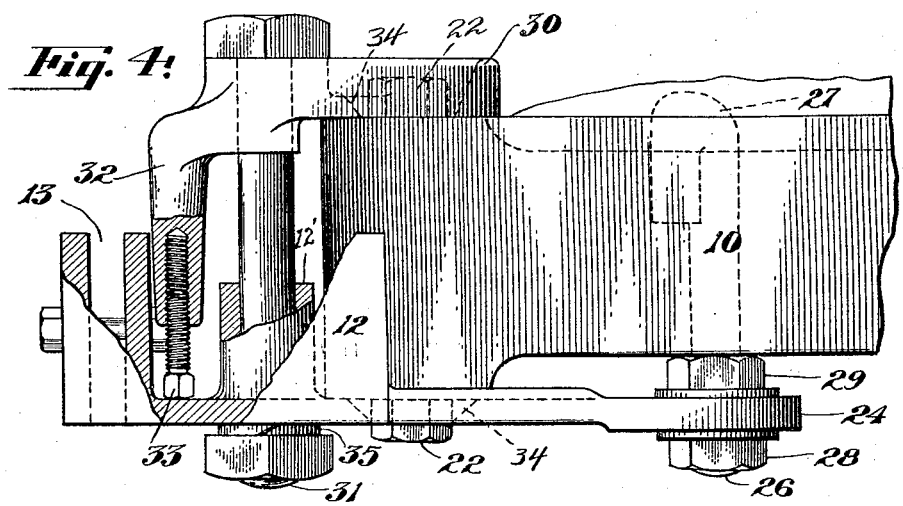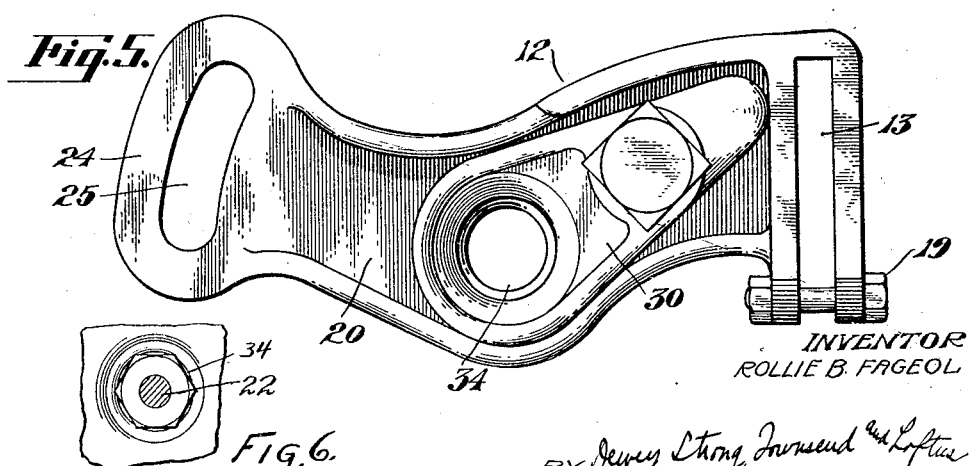

Patented July 8, 1924.

1,500,380

UNITED STATES PATENT OFFICE.

ROLLIE B. FAGEOL, OF OAKLAND, CALIFORNIA, ASSIGNOR TO AMERICAN CHAIN COMPANY, INC., OF BRIDGEPORT, CONNECTICUT, A CORPORATION OF NEW YORK.

BUMPER MOUNTING.

Application filed January 31, 1923. Serial No. 616,071.

*To all whom it may concern:*

Be it known that I, ROLLIE B. FAGEOL, a citizen of the United States, residing at Oakland, county of Alameda, and State of California, have invented new and useful Improvements in Bumper Mountings, of which the following is a specification.

This invention relates to automobile bumpers, and particularly pertains to improvements in bumper mountings by which a bumper may be secured to an automobile frame.

At the present time automobile frames are built with structural members varying in size and being assembled to produce varying dimensions between the side frame elements. In view of these variations it has been difficult to provide an automobile bumper with a mounting by which the bumper may be satisfactorily attached to any one of a large number of makes of automobiles, and it is the principal object of the present invention to provide a bumper mounting which is universally adapted for installation upon frame members varying in sectional dimensions and to support an automobile bumper from side frame elements of the vehicle, which elements may vary in their spaced relation to each other.

The present invention contemplates the use of a head adapted to receive an attaching portion of an automobile bumper, said head being disposed at the end of the bumper horn and being so designed as to be rigidly clamped to the opposite sides of the horn, irrespective of the frame dimensions.

The invention is illustrated by way of example in the accompanying drawings, in which:

Fig. 2 is a view in plan showing a double bar type of bumper mounted upon the frame of an automobile by means embodying the present invention.

Fig. 4 is an enlarged view in plan showing the mounting with parts broken away for the sake of clearness.

Fig. 5 is an enlarged view in plan showing the assembled bumper bracket disassociated from the vehicle frame and as viewed from the side, engaging the inner face of the vehicle frame.

Fig. 6 is a fragmentary view in side elevation illustrating the manner in which the bracket may be driven onto the head of the spring bolt.

Figure 1:
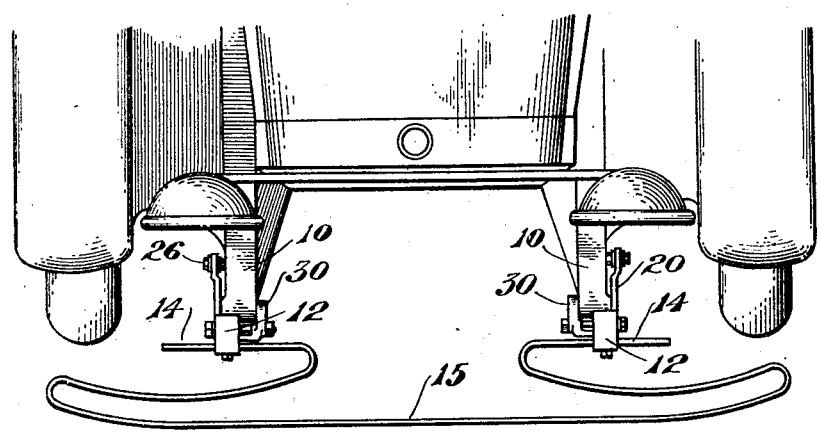
Fig. 1 is a view in plan showing a bumper of the single spring bar type attached to the frame of an automobile by mounting means embodying the present invention.

Referring more particularly to the drawings, 10 indicates the side frame elements of an automobile main frame, which elements are usually formed with forwardly projecting horns, receiving the front spring eyes of the vehicle frame suspension. The frame elements are usually channel-shaped in section, the sectional dimensions varying in different makes of cars. The side frame members are spaced varying distances apart in different makes of cars, and in view of these two variations in dimensions, it is desirable to provide a bumper mounting which may readily be adapted to such variations while insuring that a bumper will be rigidly held in position. The mounting as here shown is adapted for use with bumpers having attaching portions of flat bar steel. In Fig. 1 a so-called single bar bumper of the loop end type is disclosed, while in Fig. 2 a double bar bumper is illustrated. In either event, the mounting is adapted to accommodate certain sections of the bumper bars and to be adjustably secured to said sections whereby varying distances between the mountings may be obtained.

Figure 3:
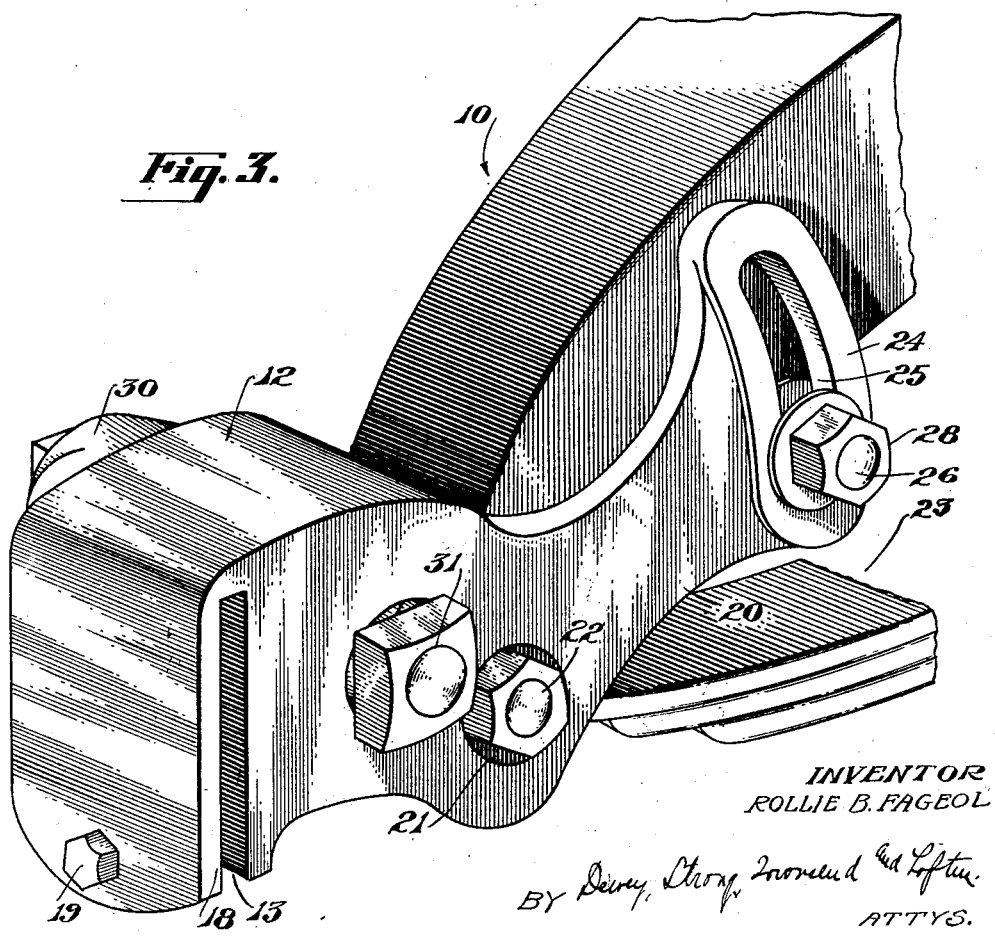
Fig. 3 is an enlarged view in perspective showing one of the mountings attached to the frame horn of the vehicle.

Referring more particularly to Fig. 3 of the drawings, it will be seen that the bumper mounting comprises a head 12 which is disposed forwardly of the frame horn and substantially abuts against the terminating end of the frame. This head is constructed with a lateral slot 13 through which a portion of a bumper may extend, as, for example, the length 14 of the single bar bumper 15 shown in Fig. 1, or the back bar 16 of the double bar bumper 17 shown in Fig. 2. The width of the slot 13 is sufficient to accommodate the attaching portion of the bumper and at the same time will insure that the bumper may be rigidly clamped within the slot. This is accomplished due to the fact that the slot is open-ended at its bottom, thereby providing the head 12 with a clamping jaw 18 which may be drawn against the bumper by a set screw 19. This arrangement also permits the mounting to be moved longitudinally of the bumper and to be rigidly secured thereto at any desired point along the length of the bumper. A bracket arm 20 forms a continuation of the head 12 and usually extends along the outer face of the channel element. This arm is formed with an aperture 21 which accommodates the head of spring bolt 22. This spring bolt passes through the end of the frame horn and the eye of the front vehicle spring 23. It will thus be apparent that when there are slight irregularities in the dimensions of the heads and nuts of the spring bolts the bracket arm 20 may be driven onto the bolt head and due to the bevelled formation of the side wall of opening 34 the weakened edge of this side wall will be broken away to accommodate the bolt head and will thus permit the bracket 20 to be firmly centered over the head as more clearly shown in Fig. 6 of the drawing. The aperture 34 has a beveled wall so that the plate may be firmly seated around the bolt head and, if necessary, the thin edge of the opening may be broken in forcing it over the bolt head. The arm extends rearwardly from the location of the spring bolt and terminates in an enlarged end 24. This end represents a segment of a circle concentric with the opening 21. An arcuate slot 25 is formed through this segment to receive a stabilizing bolt 26. This bolt passes through the slot and extends beneath the frame element 10 and terminates at its innermost end in a hook 27 which merely passes around the lower flange of the frame channel and tends to stabilize the bracket 20. This bolt not only stabilizes the bracket but provides vertical adjustment for the mounting so that the bumper will lie in a desired plane in front of the frame. This is accomplished by swinging the bracket arm vertically around the spring bolt 22 and thereafter setting the arm by tightening the outermost nut 28 of the bolt 26. Referring to Fig. 4 it will be seen that an inner nut 29 is carried by the bolt and serves to tighten the bolt 27 onto the channel. The bracket 20 is rigidly secured to the frame element 10 by a clamping plate 30. This plate is intended to lie in a plane parallel to the bracket 20 and to engage the opposite side of the frame member 10 from that occupied by the bracket 20. A suitable boss 12' is formed in the head of the mounting as shown in Fig. 4 and through which clamping bolt 31 passes. This boss is of a length great enough to give sufficient bearing to the clamping bolt 31 to prevent this bolt from being canted.

Referring to Fig. 4 it will be seen that the head 12 is recessed on the facing plate 20 to receive an adjusting arm 32 of the plate 30. This arm extends at right angles to the plate and parallel to the bolt 31. The inwardly projecting end of the arm is fitted with an adjusting screw 33 which may be adjusted to cause the outer end of the plate 30 to be held against movement, thus providing a fulcrum which will insure that when the bolt 31 is tightened the plate 30 will be drawn inwardly against the frame member 10, rigidly and positively clamping the same. Referring to Fig. 5, it will be seen that an opening 34, preferably oval in form, is formed through the plate 30 for the purpose of accommodating the opposite end of the spring bolt 22 and for permitting the facing of the plate 20 to be drawn tightly against the side face of the frame member 10.

In operation, a pair of the bumper mountings is applied to a bumper and loosely disposed thereon. After this has been done, the brackets may be attached to the main frame of the automobile by arranging the arms 20 along the opposite outward faces of the frame elements 10. The stabilizing bolts 27 may then be brought into engagement with the lower flange of the channels and loosely attached. The plate 30 may at the same time be slipped around the end of the frame horn and over the head of the spring bolt 22. Prior to this it will be understood that the set screw 33 will have been adjusted so that it and the arm 32 will dispose the plate 30 a distance from the arm 20 substantially agreeing with the width of the frame member 10. The arm 20 and the plate 30 may then be drawn toward each other to rigidly clamp against the opposite sides of the frame member 10 by tightening up the nut on the bolt 31. It is desirable to place a lock washer 35 between the nut and the outer face of the arm 20 so that the nut on the bolt 31 will not become loosened by vibration of the vehicle. The nuts 28 and 29 on the stabilizing bolt 27 may then be tightened to dispose the slot 13 in a vertical plane and to rigidly hold the swinging end of the arm 20 relative to the frame of the vehicle.

It will thus be seen that by the arrangement here disclosed, a desirable bumper mounting is provided which is universal in its application to the frame of a vehicle accommodating frames of different widths, frame members of varying dimensions, and having horns varying in design, and that in addition a bumper may be adjustably supported across the end of the frame by the mounting here disclosed, and held in a rigid manner, irrespective of impact delivered to the bumper bar from any direction.

While I have shown the preferred form of my invention as now known to me, it will be understood that various changes might be made in the combination, construction and arrangement of parts by those skilled in the art, without departing from the spirit of the invention as claimed.

Having thus described my invention, what I claim and desire to secure by Letters Patent is:

1. A bumper supporting device comprising a head adapted to be disposed forwardly of the end of a vehicle frame horn, means for adjustably clamping the head thereto, a mounting arm forming a continuation of said head and extending along one side of the vehicle frame horn, a clamping plate adapted to extend parallel to the mounting arm along the opposite side of the frame horn, and means for drawing the plate toward the head to clamp the frame horn between the arm and the plate, and means providing an adjustable purchase for the clamping plate whereby it will be positively drawn and maintained in its clamping position.

2. A bumper mounting comprising a pair of clamping plates adapted to be disposed upon opposite sides of a vehicle frame horn, means for clamping said plates against the opposite sides of the horn to rigidly secure the head to the frame, and means substantially maintaining the plates in parallelism comprising adjustable means interposed between the forward ends of the plates.

3. Means for mounting a bumper on a vehicle frame including a pair of clamping plates adapted to be disposed along opposite sides of a frame horn, a single clamping member for drawing the plates together in a gripping action against the horn, and adjustable means for maintaining the plates substantially parallel when tightened and thus insuring that the plates will firmly remain in their clamped position, said means comprising an extensible member interposed between the forward ends of the plates and adapted to be adjusted to fix the forward ends of the plates in spaced relation to each other.

4. In a bumper mounting adapted to be secured to a vehicle frame horn and centered around the spring bolt at the end of said horn, said mounting including a plate extending along the side of the horn and being formed with an opening through which the head of a spring bolt may pass and which opening has a weakened edge permitting bolt heads of varying dimensions to be forced through the opening and to be positively centered thereby.

5. In a bumper mounting adapted to be secured to a vehicle frame horn and centered around the spring bolt at the end of said horn, said mounting including a plate extending along the side of the horn and being formed with an opening through which the head of a spring bolt may pass and which opening has a weakened edge permitting bolt heads of varying dimensions to be forced through the opening and to be positively centered thereby, and auxiliary clamping means for securing said member in its clamped position.

6. In a bumper mounting adapted to be secured to the horn of a vehicle frame, a head for receiving a bumper bar and supporting it transversely of the vehicle frame, while permitting its longitudinal adjustment, a plate formed as part of said head and extending along one side of said frame and parallel thereto, said plate being centered upon the spring bolt of the frame horn, means for clamping the rear end of said plate to the frame, a plate extending along the opposite side of the frame horn and being centered on the spring bolt, a bolt passing through the two plates forwardly of the horn and a screw carried by the last-named plate and extending parallel to the bolt whereby it may be adjusted to abut against the face of the first-named plate and limit the movement of the ends of the plates forward of the clamping bolt toward each other.

7. In a bumper mounting adapted to be secured to the horn of a vehicle frame, a head for receiving a bumper bar and supporting it transversely of the vehicle frame, while permitting its longitudinal adjustment, a plate formed as part of said head and extending along one side of said frame and parallel thereto, said plate being centered upon the spring bolt of the frame horn, means for clamping the rear end of said plate to the frame, a plate extending along the opposite side of the frame horn and being centered on the spring bolt, a bolt passing through the two plates forwardly of the horn, a screw carried by the last-named plate and extending parallel to the bolt whereby it may be adjusted to abut against the face of the first-named plate and limit the movement of the ends of the plates forward of the clamping bolt toward each other, and an abutment carried by the first-mentioned plate and resting against the end of the frame horns.

ROLLIE B. FAGEOL.